United States Patent
Fatula, Jr. et al.

(10) Patent No.: US 6,679,762 B2
(45) Date of Patent: Jan. 20, 2004

(54) RECESSION CONTROL VIA THERMAL EXPANSION COEFFICIENT DIFFERENCES IN RECORDING HEADS DURING LAPPING

(75) Inventors: Joseph John Fatula, Jr., San Jose, CA (US); Hans-Peter Nickel, Bad Camberg (DE)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 246 days.

(21) Appl. No.: 09/839,099

(22) Filed: Apr. 19, 2001

(65) Prior Publication Data

US 2002/0155794 A1 Oct. 24, 2002

(51) Int. Cl.$^7$ ................................................. B24B 1/00
(52) U.S. Cl. ........................................ 451/53; 29/603.08
(58) Field of Search ............................ 451/5, 7, 8, 53, 451/55; 29/603.07, 603.08, 603.12, 603.15, 603.16, 603.17

(56) References Cited

U.S. PATENT DOCUMENTS

| | | | | |
|---|---|---|---|---|
| 4,143,458 A | * | 3/1979 | Gibson | 29/603.12 |
| 4,370,801 A | * | 2/1983 | Roscamp et al. | 29/603.14 |
| 4,951,381 A | * | 8/1990 | Yamazaki et al. | 29/603.08 |
| 5,373,731 A | * | 12/1994 | Tanaka et al. | 73/104 |
| 5,469,312 A | | 11/1995 | Watanabe et al. | 360/103 |
| 5,632,669 A | * | 5/1997 | Azarian et al. | 451/54 |
| 5,634,259 A | | 6/1997 | Sone et al. | 29/603.12 |
| 5,687,045 A | | 11/1997 | Okai et al. | 360/126 |
| 5,761,790 A | | 6/1998 | Carr et al. | 29/603.15 |
| 5,772,493 A | * | 6/1998 | Rottmayer et al. | 451/5 |
| 5,872,684 A | | 2/1999 | Hadfield et al. | 360/103 |
| 5,873,769 A | * | 2/1999 | Chiou et al. | 451/7 |
| 5,934,980 A | * | 8/1999 | Koos et al. | 451/41 |
| 5,959,801 A | | 9/1999 | Gillis et al. | 360/75 |
| 5,974,657 A | * | 11/1999 | Fox et al. | 29/603.08 |
| 5,991,113 A | | 11/1999 | Meyer et al. | 360/75 |
| 6,299,514 B1 | * | 10/2001 | Boller | 451/262 |

FOREIGN PATENT DOCUMENTS

| | | | | |
|---|---|---|---|---|
| JP | 60177420 | | 9/1985 | G11B/5/39 |
| JP | 4-339308 | | 11/1992 | |
| JP | 9293221 | * | 11/1997 | G11B/5/60 |
| JP | 11316927 | | 11/1999 | G11B/5/60 |

OTHER PUBLICATIONS

IBM TDB, Magnetic Head with Piezoelectric Positioning, vol. 16, No. 5, p. 1429 Oct. 1973.

* cited by examiner

*Primary Examiner*—Lee D. Wilson
(74) *Attorney, Agent, or Firm*—Lewis L. Nunnelley

(57) ABSTRACT

A method is disclosed for precision control of pole tip recession of magnetic recording heads. This is achieved by first constructing the head so that the thermal expansion coefficient of the recording head is different from the thermal expansion coefficient of the overcoat. Then the recording head is heated during the lapping process of the slider and recording head. The average and distribution of the recession between the overcoat and the recording head pole tips are improved.

1 Claim, 2 Drawing Sheets

RECESSION CONTROL VIA THERMAL EXPANSION COEFFICIENT DIFFERENCES IN RECORDING HEADS DURING LAPPING

BACKGROUND OF THE INVENTION

1. Field of the Invention

The present invention relates to a magnetic head assembly used in a magnetic disk apparatus for recording information on and reproducing information from a recording medium, and more particularly to an improved method of manufacturing a head.

2. Description of the Background Art

Digital magnetic recording devices for data storage generally comprise a thin film magnetic recording disk and a recording head which is moved above the surface of the rotating disk to read and write information on the disk. Advanced slider head assemblies generally comprise a rigid substrate for the slider, a recording head, and protective overcoat films.

During operation of the disk drive system, an actuator mechanism moves the magnetic transducer to a desired radial position on the surface of the rotating disk where the recording head reads or writes data. The slider is generally rectangular in shape and the recording head usually comprising a separate read and write element is formed on an end surface of the slider. Typically this end surface of the slider will constitute the slider trailing surface when the slider head assembly is suspended above a rotating disk.

The slider portion, which constitutes the bulk of the slider head assembly is made of a ceramic substrate such as alumina-titanium carbide or another suitable material. The recording head portion of the slider head assembly typically is a sequence of thin layers of insulating materials such as alumina along with the recording head comprising the read head and the write head. The read and write heads are generally comprised of a sequence of several thin metallic films.

The slider generally serves to mechanically support the head and any electrical connections between the recording head and the rest of the disk drive system. One surface of the slider is aerodynamically shaped to glide over moving air in order to maintain a uniform distance from the surface of the rotating disk, thereby preventing the head from undesirably contacting the disk. This surface is the airbearing surface. The magnetically active ends of the recording head are positioned on the air bearing surface.

In high density magnetic recording, it is important to maintain clearance between the slider on which the recording head is attached and the rotating disk upon which data is recorded and subsequently recovered during read back. This clearance is required in order to achieve a mechanical interface which has high reliability. It is also desirable to minimize the spacing between the recording head and the rotating disk in order to achieve high recording density. In order to simultaneously achieve both of these requirements it is advantageous during the operation of a disk drive to have the lowest point of both the slider and the recording head be the same distance from the disk.

Final dimensional control of the slider head assembly is achieved by lapping. The electrically active recording head exposed at the air bearing surface are generally softer than the ceramic slider body. As a consequence, the particles used in the conventional lapping process of the slider tend to erode the softer materials faster than the harder slider body. This results in a recession of the recording head away from the air bearing surface of the slider increasing the total distance from the recording head to the recording disk. This recession is sometimes called pole tip recession because it is measured from the pole tips of the recording head. Typically recording heads are recessed from the alumina overcoat and usually the overcoat is recessed from the air bearing surface.

Pole tip recession is a common feature when conventional lapping processes are used. Conventional lapping processes utilize either oscillatory or rotary motion of the slider head assembly workpiece across either a rotating or oscillating lapping plate to provide a random motion of the workpiece over the lapping plate and randomize plate imperfections across the slider head surface in the course of lapping. The amount of recession is influenced by the slurry chemistry, the lapping speed and time, lapping pressure, the roughness of the pad or plate, and the temperature during the process. Ordinarily a layer of alumina, $Al_2O_3$, is formed on the trailing surface of the slider and recording head. The metallic structure of the recording head is formed on this insulating layer disposed on the slider and then an overcoat layer, usually alumina, is formed over the recording head. Generally the overcoat layer is much thicker than the insulating layer. While there have been attempts in the past to improve the recession by altering the lapping process, these attempts have generally been focussed on the recession as defined from the air bearing surface of the slider to the alumina overcoat.

Magnetically, the important spacing is from the pole tips to the recording media. Any recession of the pole tips from the air bearing surface of the slider is generally not useful. The total recession from the air bearing surface to the pole tips is the sum of a first recession from the air bearing surface to the overcoat and a second recession from the overcoat to the pole tips. It is possible to have protrusion or negative recession, but this is uncommon and usually both first and second recessions are typically recessed away from the recording disk.

The manufacturing processes carried out to achieve lapping result in a distribution of recession values. The two most important aspects of recession are the average value and the distribution of those values for a large number of slider head assemblies. Generally the distribution of the recession values from the air bearing surface to the alumina layers is more narrowly distributed compared to the recession values from the alumina layers to the recording head. Thus, the biggest contributor to the width of the distribution of the total recession distribution is the width of the distribution of the distances from alumina to pole tips. Accordingly there is a need for a process which allows for reduced alumina to pole tip recession and more precision in controlling the alumina to pole tip recession.

SUMMARY OF THE INVENTION

To achieve the above and other objects, there is provided a method of controlling the relative recession distances between the alumina layers and the metallic recording head structure during the lapping process of a slider head assembly. This method takes advantage of the fact that the insulating and overcoat layers, not limited to but most commonly alumina, have a different thermal expansion coefficient than the metallic head structure. By placing the combined structure in a controlled thermal environment during the lapping procedure, the relative offset between the head and the insulating and overcoat layers can be controlled with more precision. This results in a recession distribution in which the mean is better controlled and the distribution is substantially improved.

The preferred embodiment is to pass a current through the write head portion of the recording head during the lapping process of a slider head assembly. This has several advantages including being relative easy to implement. The heat from the current dissipation in the write head coil is delivered precisely to the head structure and the surrounding layers. It is desired that the coefficient of thermal expansion for the insulating and overcoat layers be greater than for the metallic head structure. There are many useful combinations of alloys and overcoat layers that meet this criterion.

An alternative embodiment of this invention is to cool the head and overcoat relative to ambient temperatures. This is the preferred method when the coefficient of thermal expansion for the insulating and overcoat layers is less than that of the metallic head structure.

Most lapping processes in current use are designed for rows of sliders. A row of sliders is a sequence of recording head structures on a common ceramic substrate before the substrate is separated into individual sliders. A row may contain 40 to 50 slider head assemblies before final separation into individual sliders. More precision is possible when lapping each individual slider after separation from rows. One advantage of the present invention is that it is easily implemented for either row lapping or individual slider lapping.

DETAILED DESCRIPTION OF THE INVENTION

Figure 1:
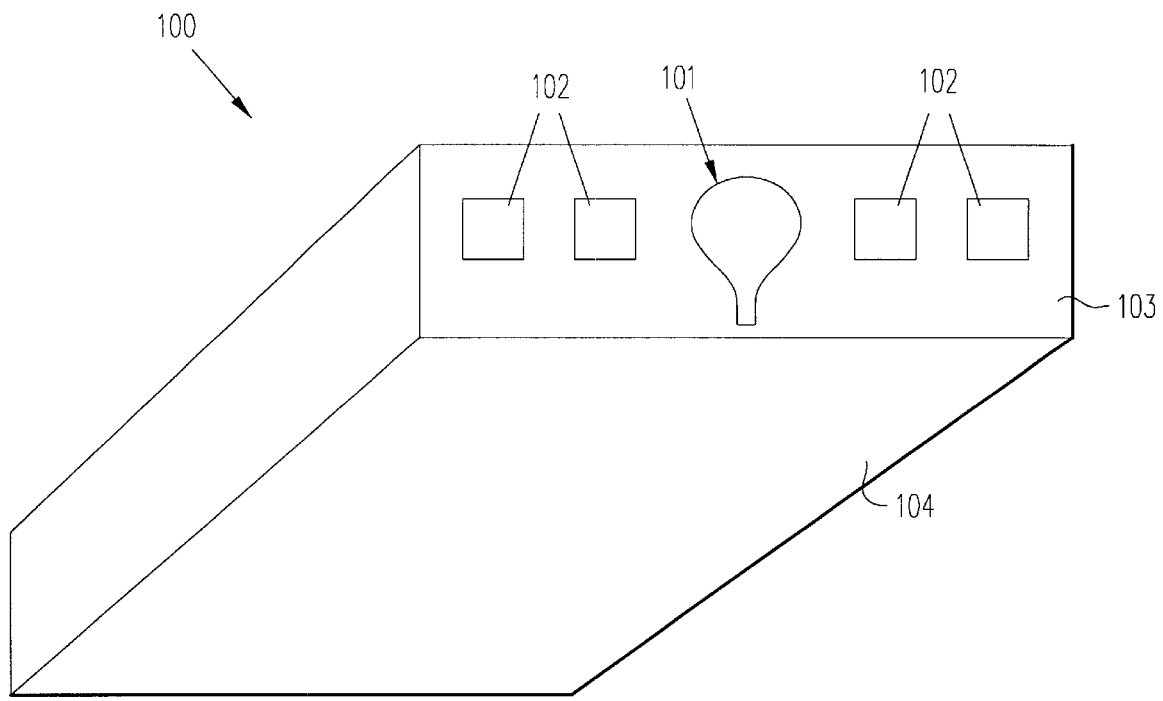
FIG. 1 shows a drawing of a slider head assembly.

FIG. 1 shows a drawing of a typical slider and head assembly used for recording digital information in a hard disk drive. The main body of the slider 100 is generally made of a ceramic material such as alumina-titanium carbide. Sliders have one surface 104 which is designed to be positioned in close proximity to a recording disk. Accordingly this surface 104 has a pattern which facilitates the slider in floating on a thin cushion of air over the disk and is therefore called the air bearing surface. The trailing surface of the slider 103 is where the recording head 101 is constructed. Also on the trailing surface are metal pads 102 which are connected to the read and write elements in the recording head assembly and provide means for electrical connection.

Figure 2:
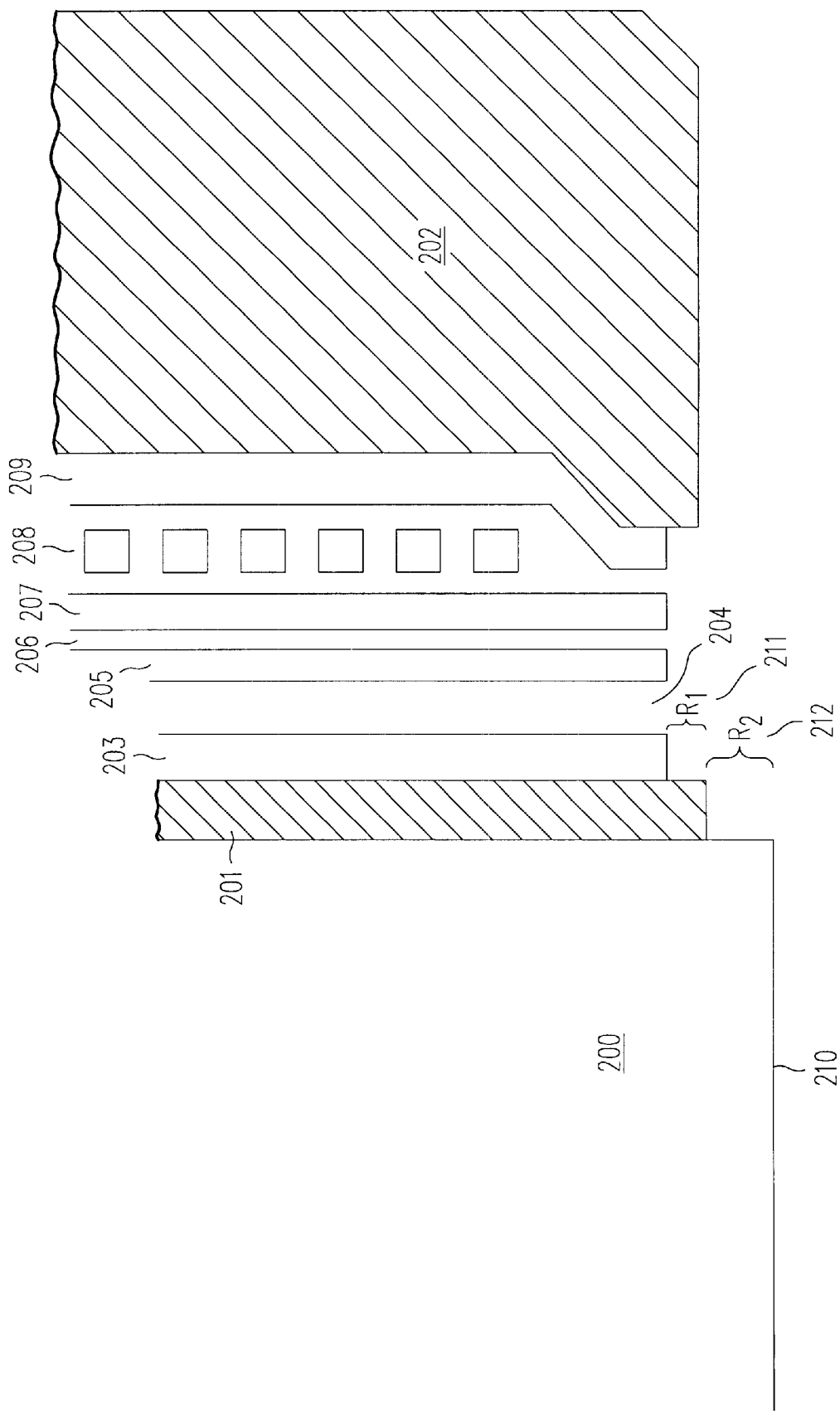
FIG. 2 shows a detailed cross sectional view of the slider in the vicinity of the magnetic sensor and the air bearing surface.

FIG. 2 shows a detailed cross section view of the slider and head. The slider body 200 is shown along with the air bearing surface 210. An insulating layer 201, typically of alumina, is first placed on the trailing surface of the slider. The subsequent portions of the head assembly are then placed on the insulating layer 201. The first metallic layer of the head assembly is the first magnetic shield 203 for the read element 204. The read element 204 is a composite of several thin layers. A second magnetic shield 205 is then placed on the read element 204. Some structures have a gap 206 between the second sensor shield 205 and the first pole 207 of the write head. This gap is not mandatory and some designs combine the second shield 205 and the first pole 207 into the same physical layer. Coils 208, generally made of copper, are then placed between the first pole 207 and the second pole 209 of the write head. Most recording heads have separate read elements, sometimes called read heads, and write elements, sometimes called write heads. The combination of the read and write elements is usually referred to as the recording head or the head assembly. An overcoat layer 202 is then formed on the recording head. Typically the overcoat layer 202 is made of almunia and is usually much thicker than the insulating layer 212. The combination of the slider, insulating layer, recording head, and overcoat is referred to as the slider head assembly. A typical thickness range for the insulating layer 201 is from 2 $\mu$m to 4 $\mu$m, and a typical thickness range for the overcoat layer is from 20 $\mu$m to 40 $\mu$m. Also illustrated in FIG. 2 is the recession $R_2$ 212 between the air bearing surface 210 and the insulating layer 201 and overcoat 202. For purposes of clarity the shields 203 and 205 and the write pole tips 207 and 209 are shown to be the same height above the air bearing surface 210. This is generally the case but need not be strictly true. Likewise the height of the insulating layer 201 and the overcoat 202 is drawn to the same height above the air bearing surface. These two layers may also have different recession values. The recession $R_1$ 211 between the poletips and the overcoat is also shown.

In order for the present invention to be most effective it is desirable for the coefficient of thermal expansion of the overcoat to be greater than the coefficient of thermal expansion for the composite head structure. The largest and longest portion of the head structure in the direction perpendicular to the air bearing surface are the poles 207 and 209 of the write head. A popular alloy for the write head structure is 45%Ni55%Fe, simply referred to as 45/55. This alloy has a thermal expansion coefficient of about $7.5 \times 10^{-6}$. The thermal expansion of alumina is about $9.0 \times 10^{-6}$. Thus when the recording head is heated the alumina will expand more than the metallic head structure. If the slider is then lapped while at elevated temperature, the alumina will be preferentially lapped away leaving a much smaller value of recession between the pole tips and the overcoat and a tighter distribution of recession values. Binary NiFe alloy compositions which meet the criterion of having a lower coefficient of thermal expansion than alumina range from about 30%Ni70%Fe to about 48%Ni52%Fe. Any ternary alloy which simultaneously meets the magnetic requirements and has a coefficient of thermal expansion less than $9 \times 10^{-6}$ would also be effective. It is also possible to choose an overcoat material other than alumina. The requirement is that the coefficient of thermal expansion of the overcoat is higher than that of the composite head structure.

A numerical example is perhaps useful to illustrate the invention. If the yoke length of the write head is 15 $\mu$m and the difference in the thermal expansion coefficients is $1.5 \times 10^{-6}$, then a temperature increase of 100° C. would cause a length difference of about 2.3 nm. Typical recession values of 2–3 nm are achieved with standard lapping processes. Accordingly the heating technique disclosed here compensates the recession during lapping.

Figure 3:
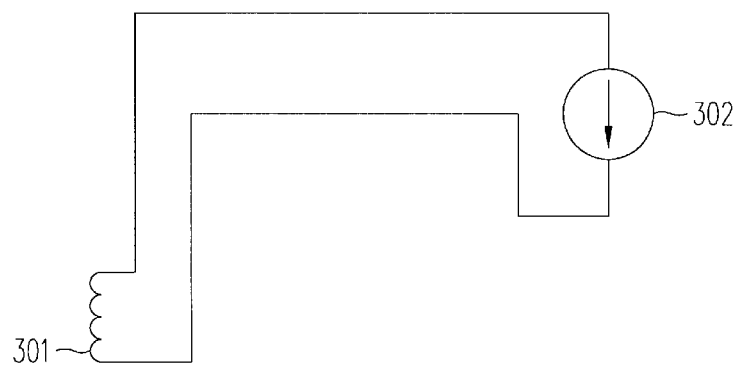
FIG. 3 shows a diagram of the current supply for the write coils during lapping.

In addition to the standard apparatus for lapping sliders an additional apparatus is required. The additional apparatus is conceptually drawn in FIG. 3. A current source 302 is connected to the write head coils 301. The electrical connection is made using the metal pads 102 illustrated in FIG. 1. The current is passed through the coils during the normal lapping operation. Using a typical write head, it was found that a current of 60 mA resulted in a temperature increase of about 100° C. The actual required current depends to some extent on the details of the head geometry, the difference in expansion coefficients, and the desired change in the positions of the poletips and overcoat during the lapping operation.

An alternative method of implementing the present invention is to heat the recording head using an external heating source. This can be accomplished by applying a controlled LASER light source or infared light source to the head. Another alternative method is to heat the recording head with a stream of heated gas or fluid to the appropriate temperature.

An alternative embodiment of this invention is to cool the head and overcoat relative to ambient temperatures. This is the preferred method when the coefficient of thermal expansion for the insulating and overcoat layers is less than that of the metallic head structure. Cooling of the head can be accomplished by with a stream of cooled gas or fluid. Alternatively cooling can be accomplished by conduction of heat flow from the head into a heat sink near the head.

The other steps of lapping either rows or individual sliders are well known. These steps comprise pressing the sliders onto a lapping plate. Generally a slurry containing a liquid and small abrasion particles is applied between the slider and lapping plate. The slider is then moved relative to the lapping plate for a prescribed time.

We claim:

1. A method for lapping a slider recording head assembly having a slider, a recording head with a write element, and an overcoat layer, comprising:

lapping said slider recording head assembly; and, passing current through said write element during said lapping, wherein said overcoat has a higher coefficient of thermal expansion than said recording head.

* * * * *